United States Patent [19]
Bernardin et al.

[11] Patent Number: 5,534,142
[45] Date of Patent: Jul. 9, 1996

[54] FLOW-REVERSING SYSTEM FOR SERIES CONNECTED REACTION CHAMBERS

[75] Inventors: Frederick E. Bernardin; Ronald L. Peterson, both of Tucson, Ariz.

[73] Assignee: Vulcan Peroxidation Systems, Inc., Tucson, Ariz.

[21] Appl. No.: 344,992

[22] Filed: Nov. 25, 1994

[51] Int. Cl.⁶ .............................. B01D 17/12; B01J 4/00
[52] U.S. Cl. ........................ 210/141; 137/572; 422/188
[58] Field of Search ................................. 210/141, 143; 137/571, 572, 573, 599; 422/186.03, 186.3, 188, 189, 193, 195

[56] References Cited

U.S. PATENT DOCUMENTS

| | | | |
|---|---|---|---|
| 3,069,348 | 12/1962 | Bergstrom | 137/571 |
| 4,897,246 | 1/1990 | Peterson | 422/186.3 |
| 5,037,618 | 8/1991 | Hager | 422/186.03 |
| 5,227,140 | 7/1993 | Hager et al. | 422/186.3 |

Primary Examiner—Joseph W. Drodge
Attorney, Agent, or Firm—Daniel C. McKown

[57] ABSTRACT

Apparatus for use in a multi-stage system in which a fluid being treated is passed in succession through a first stage A, a second stage B, a third stage C, etc. includes a controlled system of valved interconnections that permits the direction of flow within each stage to be reversed while preserving the original sequence ABC . . . in which the fluid progresses from stage to stage. The stages may be reaction chambers in which chemical or photo-chemical reactions are carried out or the stages may be filters that need to be reverse-flushed at intervals. In accordance with the invention, a second set of inter-stage connections is provided, in addition to the original connections used for forward flow. In the second set, the inlet and outlet ports are located at opposite ends of each stage from the inlet and outlet ports used in the original connections. Each inter-stage connection includes a valve, and the valves in the original set of interconnections are operated in unison, as are the valves in the second set of interconnections. The valves of the original set are all open and the valves of the second set are all closed for forward flow. For reversed flow, the valves of the original set are closed and the valves of the second set are open.

3 Claims, 3 Drawing Sheets

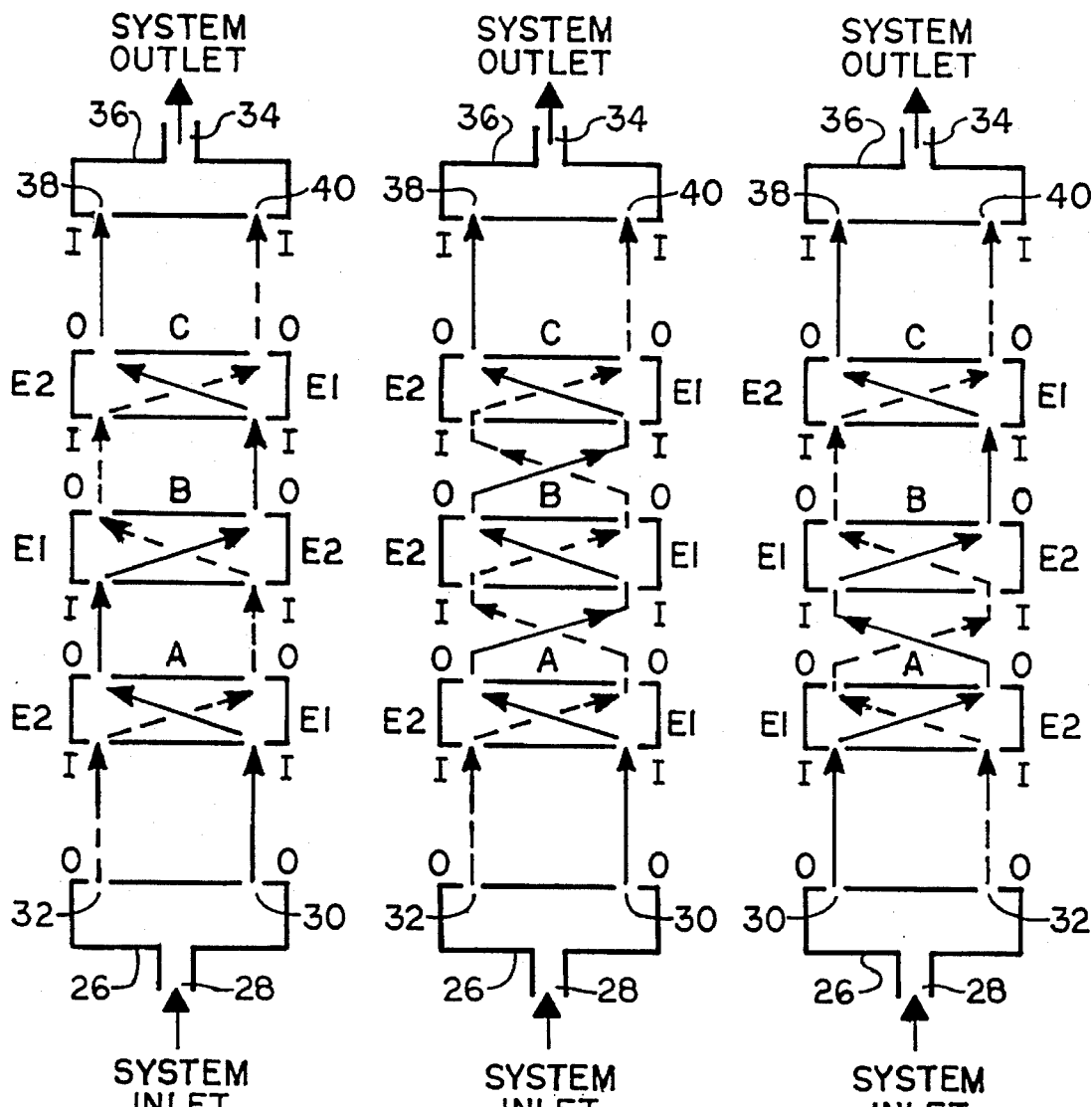

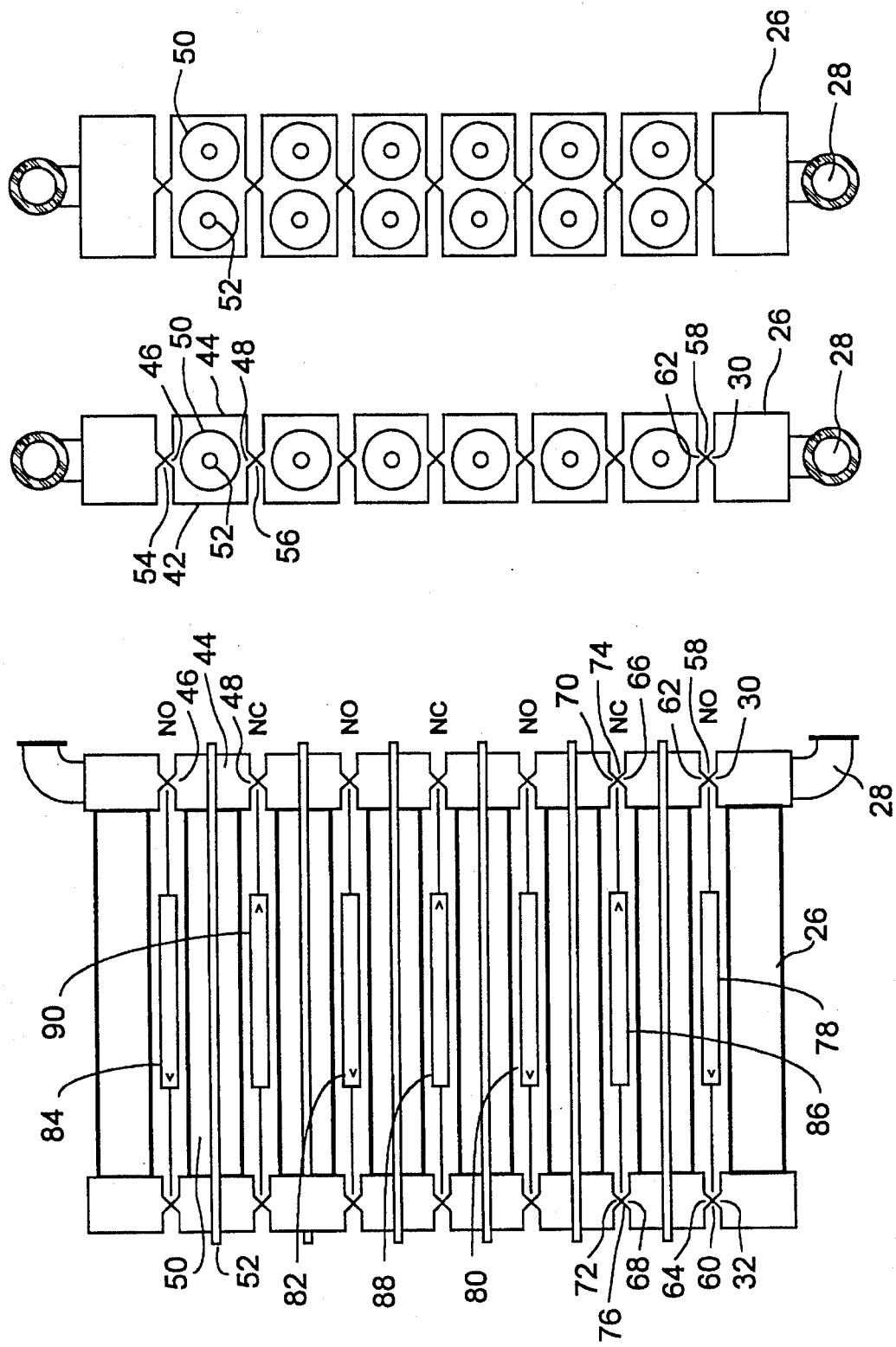

_5,534,142_

FLOW-REVERSING SYSTEM FOR SERIES CONNECTED REACTION CHAMBERS

BACKGROUND OF THE INVENTION

1. Field of the Invention

The present invention is in the field of wastewater treatment, particularly water containing harmful organic contaminants. More specifically, the invention is a valving system for use in a purification system having successive reaction chambers. The invention makes it possible to reverse the flow direction within each chamber while enabling the water to progress through the chambers in the original sequence.

2. The Prior Art

The present invention grew out of continued work on an apparatus for treating wastewater. As described in U.S. Pat. No. 4,897,246, the apparatus uses hydrogen peroxide and ultraviolet radiation to break down and oxidize the organic contaminants. Because the ultraviolet lamps used are of limited length, and for other reasons, the process is carried out in a number of reaction chambers that are connected in series, as described in U.S. Pat. No. 5,037,618 of Hager.

In the apparatus, the ultraviolet lamps are enclosed in quartz tubes, which in turn are mounted in the reaction chamber and surrounded by the water that is being treated.

One of the problems encountered was that of the fouling of the quartz tubes by materials present in the water being treated. This fouling can reduce the optical efficiency of the chamber to the point where it becomes necessary to interrupt the process and to remove the quartz tubes for cleaning.

In an attempt to overcome this need for interrupting the process, a shuttling scraper was developed. The scraper is pushed through the chamber by the pressure and flow of the liquid being treated. Using the shuttling scraper it is not necessary to disassemble the chamber, but merely to reverse the flow through it occasionally so that the scraper will be driven from one end of the chamber to the other end. The shuttling scraper and a hydraulic system for reversing the flow are described at greater length U.S. Pat. No. 5,227,140. The disclosures of U.S. Pat. Nos. 4,897,246; 5,037,618; and 5,227,140 are incorporated by reference into the present description.

FIG. 1 is adapted from FIG. 5 of U.S. Pat. No. 5,227,140. The direction of flow through the reactor 12, which includes six reaction chambers, is controlled by the valves 14, 16, 18 and 20. Forward flow obtains when the valves 14 and 16 are open and the valves 18 and 20 are closed. Reversed flow obtains when the valves 14 and 16 are closed and the valves 18 and 20 are open. Operation of the valves is controlled by a timer (not shown).

Although the flow reversing system shown in FIG. 1 has successfully solved the fouling problem, continuing research by the present inventors has now resulted in a novel way of reversing the direction of flow.

SUMMARY OF THE INVENTION

The present invention is an apparatus for reversing the flow within each of a series of reaction chambers while preserving the sequence in which the fluid passes through the reaction chambers.

Assume the flow in the forward-flow state passes first through chamber A, then through chamber B, then C, D and E. When the flow is reversed in the present invention, the fluid will still flow first through chamber A, then through chamber B, then C, D and E. In contrast, when the flow is reversed in the prior art systems, the fluid will flow first through chamber E, then through chamber D, then C, B and A.

In accordance with the present invention, each reaction chamber is provided with an inlet port at each end as well as an outlet port at each end. A first set of interconnections connects an output port of each reaction chamber to an input port of the next reaction chamber. Each of these interconnections includes a valve and may also include some conduit on either side of the valve. A second set of interconnections connects the remaining output port of each reaction chamber to the remaining input port of the next reaction chamber. Each of this second set of interconnections also includes a valve and may include some conduit on either side of the valve. The valves of the first set of interconnections are controlled by actuators that work in unison to open or close the valves of the first set. Likewise, the valves of the second set are operated by actuators that work in unison to open or close the second set of valves. The actuators are arranged in such a way that when the second set of valves is closed, the first set of valves is fully open, and when the first set of valves is closed, the second set of valves is fully open. Forward flow occurs when the second set of valves is closed, and reverse flow results when the first set of valves is closed.

Any number of reaction chambers may be interconnected in accordance with the teaching of the present invention.

Several advantages result from use of the flow reversing system of the present invention.

A first advantage becomes apparent in those situations in which different treatments are to be applied in a particular sequence to the fluid. For example, it might be desirable to introduce a reagent or a catalyst as the first step or to heat the fluid initially, before progressing to other steps in a process. These preliminary steps might be carried out in a first chamber. Because the present invention preserves the sequence in which the fluid passes through the chambers, when the flow is reversed, the preliminary steps are still performed first. Another example would be seen in a process that concludes with a stage of fine filtering, where it is desired that this step should always be the concluding step.

A second advantage of the flow reversing system of the present invention becomes apparent if the reaction chambers are spaced vertically, so that the fluid rises or descends as it passes through the chambers. Using the present invention, the fluid will continue to rise or descend as it advances from one chamber to the next, even when the flow is reversed. This feature is valuable if buoyant precipitates or bubbles are to be swept upward by the flow.

A third advantage is inherent in the present invention. Assume there are five reaction chambers A, B, C, D and E. If the reaction chambers are connected in series in the conventional way, a particle of fluid that was just about to leave chamber E at the time of flow reversal would have to travel back through E, then through D, C, B and A, thereby being subjected twice to the entire treatment. This could result in excessive heating of the fluid. In contrast, if the chambers are connected in accordance with the present invention, a particle of fluid that was just about to leave chamber E at the time of flow-reversal would travel back through chamber E and would then leave the system, because with the present invention chamber E remains the last chamber regardless of the flow direction. Thus, the present invention greatly reduces the possibility of excessive heating due to double processing.

Similarly, consider a particle of fluid that has not reached the midpoint of the oxidation chamber when flow reversal occurs. If the chambers are connected in series in the conventional way, the particle will eventually leave the oxidation chamber after flow reversal and will be discharged with less than full treatment. However, if the chambers are connected in accord with the present invention, the worst case of the particle of fluid that has just entered chamber A when flow reversal occurs is improved in that it will immediately leave chamber A but will thereafter pass through chambers C, D, and E. Thus, the present invention greatly reduces the amount of partially treated fluid that is discharged from the system when flow is reversed.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 2 is a hydraulic diagram illustrating a preferred embodiment of the flow-reversing system of the present invention;

FIG. 3 is a hydraulic diagram illustrating a first alternative embodiment of the flow-reversing system of the present invention;

FIG. 4 is a hydraulic diagram illustrating a second alternative embodiment of the flow-reversing system of the present invention;

FIG. 5 is a side elevational view of a multi-chamber photochemical reactor embodying the flow-reversing technique of the present invention;

FIG. 6 is a front end elevational view of the reactor of FIG. 5; and,

FIG. 7 is a front end elevational view of a reactor in an alternative embodiment.

DETAILED DESCRIPTION OF THE PREFERRED EMBODIMENT

Figure 1:
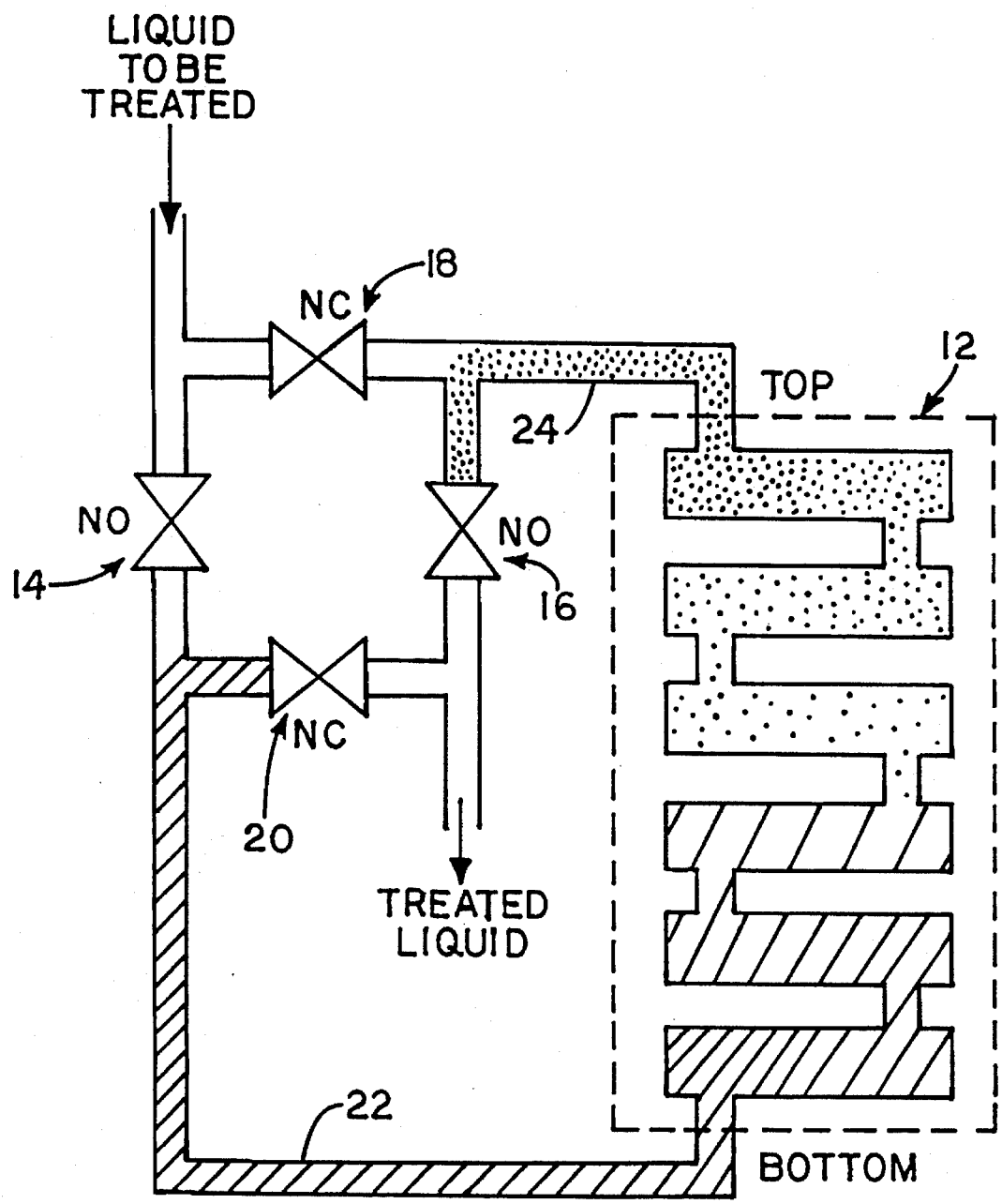
FIG. 1 is a hydraulic diagram illustrating a flow-reversing system of the prior art.

If three reaction chambers, denoted as A, B, and C, are connected in series, it would seem reasonable that flow in the forward direction would pass first through chamber A, then through chamber B and finally through chamber C. It would also seem logical that the only way to reverse the flow within each of the chambers is to reverse the sequence in which the fluid passes through the chambers so that in the reverse flow condition the fluid would pass first through chamber C, then chamber B and finally through chamber A.

Therefore it must seem paradoxical that in accordance with the present invention flow in the forward direction is through chamber A first, then chamber B, then chamber C; but when the flow direction within each chamber is reversed the fluid will still pass first through chamber A, then chamber B, and finally through chamber C!

The solution of this paradox as well as some of the useful results that the solution provides will be discussed in greater detail below.

FIG. 2 is a diagram showing the configuration of the system in a first preferred embodiment. In FIG. 2 (as well as in FIGS. 3 and 4), the system includes three reaction chambers denoted as A, B, and C. Initially the fluid flows into the system through the system inlet 28 which feeds the inlet manifold 26. The inlet manifold 26 includes two outlet ports, 30 and 32.

The fluid that has passed through the system emerges from the system outlet 34 located on the outlet manifold 36 and fed by the inlet ports 38 and 40.

Although three reaction chambers A, B, and C are used in the embodiments of FIGS. 2, 3, and 4, it is to be understood that any number N of reaction chambers may be used, and the choice of three reaction chambers in the embodiments of FIGS. 2, 3 and 4 is strictly exemplary. Each of the reaction chambers has a first end denoted as E1 and a second end denoted E2. Each reaction chamber has, at each end, an inlet port and an outlet port. These are designated by the letters I and O respectively in the drawings. It should be noted that there are four ports for each reaction chamber plus the ports 30 and 32 of the inlet manifold and the ports 38 and 40 of the outlet manifold 36.

A first set of valved interconnections denoted by solid lines in FIGS. 2, 3 and 4 connects an outlet port 30 of the inlet manifold 26 to an inlet port of the first reaction chamber. Whichever end that inlet port is located at is denoted as the first end E1 of the reaction chamber. Another member of the first set of valve interconnections connects the output port at the second end E2 of the first reaction chamber to an inlet port of the second reaction chamber, and whichever end the inlet port is located at is denoted as the first end E1 of the second reaction chamber. A third member of the first set of valve interconnections then connects the output port at the second end of the second reaction chamber to an inlet port on the third reaction chamber, and whichever end the inlet port is located at is denoted as the first end. A fourth member of the first set of valve interconnections then connects the outlet port at the second end of the third reaction chamber to an inlet port 38 of the outlet manifold 36. It is noted that if there are N reaction chambers, then N−1 valve interconnections will be needed to join them, and in addition, two further valve interconnections will be needed to connect the first and last reaction chambers to the inlet and outlet manifolds, respectively. Thus, the first set contains N+1 valve interconnections.

A second set of N+1 valve interconnections, denoted by dashed lines in FIGS. 2, 3 and 4, is also provided, and they connect the remaining port 32 of the inlet manifold 26 to the remaining inlet port of the first reaction chamber, which is located at the second end of the first reaction chamber. Other members of the second set of valve interconnections connect the outlet port at the first end of the first reaction chamber to the inlet port at the second end of the second reaction chamber. Another member of the second set of valve interconnections connects the output port at the first end of the second reaction chamber to the inlet port at the second end of the third reaction chamber. A final member of the second set of valve interconnections connects the outlet port at the first end of the third reaction chamber to the remaining inlet port 40 of the outlet manifold 36.

Each of the valve interconnections includes a valve for controlling the flow of fluid between the ports to which the valved interconnections is connected. The valves of the first set of valve interconnections are ganged for operation in unison, and likewise, the valves of the second set of valve interconnections are also ganged for operation in unison. In the preferred embodiment, all of the valves of the first set of valve interconnections are fully open when all of the valves of the second set of valve interconnections are fully closed and all of the valves of the first set of valve interconnections are fully closed when all of the valves of the second set valve interconnections are fully open. In the first case, where the valves of the first set of valve interconnections are fully open, the flow of the fluid through the system is defined by the solid lines in FIGS. 2, 3 and 4. In the other case, where the valves of the second set of valve interconnections are fully open, the flow of the fluid is defined by the dashed lines in FIGS. 2, 3 and 4.

It is noteworthy that in making the transition from the first case to the second case, the flow in each of the reaction chambers is reversed, but also the flow progresses through reaction chamber A first, then through reaction chamber B, and finally through reaction chamber C in either case.

The above description applies verbatim to the alternative embodiments of FIGS. 3 and 4 as well as to the preferred embodiment of FIG. 2.

In an alternative embodiment, the valves of the first set of valve interconnections are related to the valves of the second set of valve interconnections in such a way that a fraction k of the total flow flows through each valved interconnections of the first set and a fraction 1–k flows through each valved interconnections of second set. When this embodiment is used, the total flow through the system remains constant throughout the transition from forward flow to reverse flow.

As described above, if there are N reaction chambers, there will be N+1 valve interconnections in the first set and N+1 valve interconnections in the second set, so that the total number of valves required is 2N+2. This is roughly half as many valves as would be required if the flow reversing system of FIG. 1 were applied to each reaction chamber. In that case, the number of valves required would be 4N, although each reaction chamber would need only one inlet port and one outlet port rather than two of each.

The interconnection system described above in connection with FIGS. 2, 3 and 4 may be thought of as completely different from the conventional series connection. However, a comparison of the dashed and solid lines in FIGS. 2, 3 and 4 suggests that the new interconnection system is decomposable into two conventional series connections that are mirror images of one another. Viewed in this light, the present invention may be regarded as the addition, to a first conventional series-connected system, of a second conventional series-connected system whose inlet ports are located at the opposite ends of the reaction chambers from the inlet ports used by the first system, and whose outlet ports are also located at the opposite ends of the reaction chambers from the outlet ports used by the first system.

As mentioned above, the use of three reaction chambers in the embodiments of FIGS. 2, 3 and 4 is merely exemplary; in all cases, N is a number of reaction chambers in which flow is to be reversed at the same time. In another exemplary embodiment, it may happen that in a five-chamber reactor fouling is much more serious in the first chamber, less serious in the next two chambers, and far less serious in the last two chambers. In such a case the five-chamber reactor could be decomposed into a one-chamber reactor (N=1), in series with a two-chamber reactor (N=2), in series with a two-chamber reactor (N=2). In each of these sub-reactors, flow reversal can be carried out independently of the others. For example, it would be possible to reverse the flow through the first chamber every 13 minutes, to reverse the flow through the next two chambers every 56 minutes, and to reverse the flow through the last two every four hours. Separate inlet and outlet manifolds would be provided for each of the three groups of chambers, and the cost-effectiveness of this approach would have to be evaluated with regard to any particular application. The example is given to illustrate the point that when the principles of the present invention are used, flow reversal can be carried out in each chamber independently of the other chambers.

FIGS. 5 and 6 show a practical embodiment. In keeping with the terminology used above, it has six reaction chambers, of which the reaction chamber 42 is typical.

Unlike the simple reaction chambers shown in FIGS. 2, 3 and 4, the structure of the reaction chambers in the embodiment of FIGS. 5 and 6 is more sophisticated. Each reaction chamber includes two box-like end manifolds of which the end manifold 44 is typical. Each of these end manifolds has an inlet port and an outlet port of which the ports 46 and 48 are typical. The two end manifolds of each reaction chamber are connected by an elongated metal tube, of which the tube 50 is typical. Mounted within each tube is a quartz tube, of which the quartz tube 52 is typical. Each quartz tube 52 encloses and protects one ultraviolet lamp. The fluid being treated occupies the space surrounding the quartz tube but within the elongated metal tube. The fluid flows through the elongated metal tube 50 from one of the box-like end manifolds to the other end manifold.

The end manifolds are connected by valved interconnection, which in this embodiment consist of valves, of which the valves 54 and 56 are typical.

As in the embodiments of FIGS. 2, 3 and 4, in the embodiment of FIG. 5 the liquid to be treated enters the reactor through a system inlet 28 that feeds an inlet manifold 26 (sometimes called a return section). The inlet manifold 26 includes two outlet ports 30 and 32 that are connected by the valves 58 and 60 to inlet ports 62 and 64 at opposite ends of the first reaction chamber. The outlet ports 66 and 68 at opposite ends of the first reaction chamber are connected to the inlet ports 70 and 72 at opposite ends of the second reaction chamber by the valves 74 and 76. At this point the analogy with FIG. 2 should be apparent.

The valves used in the practical embodiment of FIGS. 5 and 6 are called "slide" or "knife" gate valves, and they are available from many manufacturers. They are pneumatically actuated, although in alternative embodiments the actuating force may be hydraulic or electrical.

In FIG. 5, the actuators 78, 80, 82 and 84 are ganged to operate in unison, each actuator closing one of the valves to which it is connected and opening the other valve to which it is connected. Likewise, the actuators 86, 88 and 90 are ganged to operate in unison, opening one of the valves to which it is connected while closing the other valve to which it is connected. In the forward flow state, the valves marked NO are fully open and the valves marked NC are completely closed.

FIG. 7 is a front end elevational view of a reactor of an alternative embodiment. As in the embodiment of FIGS. 5 and 6, each reaction chamber includes two box-like end manifolds. Unlike the embodiment of FIGS. 5 and 6, in the alternative embodiment of FIG. 7, the two end manifolds of each reaction chamber are connected by two side-by-side elongated metal tubes, of which the tube 50 is typical. Mounted within each tube is a quartz tube, of which the quartz tube 52 is typical. Each quartz tube encloses and protects one ultraviolet lamp. The fluid being treated occupies the space surrounding the quartz tube but within the elongated metal tubes. The fluid flows in parallel through the two side-by-side elongated metal tubes from one of the box-like end manifolds to the other end manifold.

It will be recognized that in the alternative embodiment of FIG. 7 that uses two side-by-side elongated metal tubes, twice as many ultraviolet lamps are used per stage as were used in the embodiment of FIGS. 5 and 6 for the same number of valves. In other embodiments the end manifolds are connected by three or more elongated metal tubes, resulting in still further improvement in the ratio of ultraviolet lamps to valves.

Thus, there has been described apparatus for reversing the direction of flow in each individual reaction chamber while not disturbing the sequence in which the fluid flows through the reaction chambers. A reactor incorporating the flow reversing apparatus of the present invention has also been described and its advantages have been discussed.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. Apparatus for reversing the direction of flow of a fluid within each of a number N of reaction chambers without altering the sequence of the reaction chambers through which the fluid flows, said apparatus comprising in combination:

an inlet manifold having a system inlet and two outlet ports;

an outlet manifold having a system outlet and two inlet ports;

a number N of reaction chambers, each having a first end and a second end, having an inlet port and an outlet port near the first end and having an inlet port and an outlet port near the second end, whereby the total number of ports including those on said inlet manifold and on said outlet manifold is 4N+4;

a first set of N+1 valved interconnections connecting a first one of the outlet ports of said inlet manifold to the inlet port near the first end of a first one of said reaction chambers, connecting the outlet port near the second end of the first reaction chamber to the inlet port near the first end of a second one of said reaction chambers, and so on if N exceeds 2 until the remaining reaction chambers have been connected in series, and connecting the outlet port near the second end of the Nth one of said reaction chambers to a first one of the inlet ports of said outlet manifold;

a second set of N+1 valved interconnections connecting the second outlet port of said inlet manifold to the inlet port near the second end of the first one of said reaction chambers, connecting the outlet port near the first end of the first reaction chamber to the inlet port near the second end of the second one of said reaction chambers, and so on if N exceeds 2 until the remaining reaction chambers have been connected in series, and connecting the outlet port near the first end of the Nth one of said reaction chambers to the second one of the inlet ports of said outlet manifold; and, actuator means operatively connected to said first set of N+1 valved interconnections and maintaining equal flow through each valved interconnection of said first set, and operatively connected to said second set of N+1 valved interconnections and maintaining equal flow through each valved interconnection of said second set, for selectively routing is also operable to apportion entire flow through said first set by interrupting flow through said second set or routing the entire flow through said second set by interrupting flow through said first set.

2. The apparatus of claim 1 wherein said actuator means apportions a fluid throughput F between said first set of N+1 valved interconnections and said second set of N+1 valved interconnections in such a way that a fraction kF flows through each valved interconnection of said first set and a fraction (1−k)F flows through each valved interconnection of said second set, where $0 \leq k \leq 1$.

3. The apparatus of claim 1 wherein said N+1 valved interconnections of said first set are ganged to operate in unison so that the flow through each is the same, and wherein said N+1 valved interconnections of said second set are ganged to operate in unison so that the flow through each is the same.

* * * * *